United States Patent [19]
Zahir et al.

[11] Patent Number: 6,112,292
[45] Date of Patent: Aug. 29, 2000

[54] CODE SEQUENCE FOR ASYNCHRONOUS BACKING STORE SWITCH UTILIZING BOTH THE COVER AND LOADRS INSTRUCTIONS

[75] Inventors: Achmed Rumi Zahir, Menlo Park; Jonathan K. Ross, Sunnyvale, both of Calif.

[73] Assignee: Idea Corporation, Santa Clara, Calif.

[21] Appl. No.: 09/064,025

[22] Filed: Apr. 21, 1998

[51] Int. Cl.[7] ...................................................... G06F 9/30
[52] U.S. Cl. .......................... 712/200; 710/264; 709/108
[58] Field of Search ............................... 712/1, 236, 200; 709/108; 710/264

[56] References Cited

U.S. PATENT DOCUMENTS

| | | | |
|---|---|---|---|
| 5,161,226 | 11/1992 | Wainer | 710/264 |
| 5,327,566 | 7/1994 | Forsyth | 710/260 |
| 5,428,779 | 6/1995 | Allegrucci et al. | 709/108 |
| 5,535,397 | 7/1996 | Durante et al. | 710/267 |
| 5,564,031 | 10/1996 | Amerson et al. | 711/209 |
| 5,640,582 | 6/1997 | Hays | 712/38 |
| 5,717,933 | 2/1998 | Mann | 710/262 |

OTHER PUBLICATIONS

A VLSI RISC, David A. Patterson and Carlo H. Sequin, Computer Magazine, vol. 15, No. 9, (ISSN 0018–9162) Sep., 1982, pp. 8–21.

RISC Systems, Daniel Tabak, Microprocessors and Microsystems, vol. 12, No. 4, May, 1988, pp. 179–185.

A Simple Interprocedural Register Allocation Algorithm and Its Effectiveness for LISP, Peter A. Steenkiste and John L. Hennessy, acm Transactions on Programming Languages and Systems, vol. 11, No. 1, Jan., 1989, pp. 1–32.

Register Stack, AM29040 Microprocessor User Manual, 29K Family, Rev. A. May 1994, pp. 4–3 –4–16.

Software Considerations, David L. Weaver/Tom Germond, The SPARC Architecture Manual, Version 9, 1994, pp. 291–294.

*Primary Examiner*—Meng-Ai T. An
*Assistant Examiner*—Mackly Monestime
*Attorney, Agent, or Firm*—Blakely Sokoloff Taylor & Zafman, LLP

[57] ABSTRACT

A computer implemented method for switching from an interrupted context to an interrupting context in a processor is provided. The processor includes a register stack (RS) that has first and second portions. The processor includes a register stack engine (RSE) that exchanges information, in one of instruction execution dependent and independent modes between the second portion and a storage area. The method includes the following steps: a state of the RSE of the interrupted context is preserved; a COVER instruction is issued; a first (BSPSTORE) pointer is preserved. The first pointer points to a location in the storage area, of the interrupted context, where a next register of the second portion is to be written; first pointer is written with a value corresponding to the interrupting context; and a second pointer (BSP) is preserved. The new first and second pointers in the interrupting context define the storage area of RS values associated with the interrupted context. The new first pointer is subtracted from the second new pointer. The difference (number of dirty registers) is deposited into the RSC.loadrs field. A LOADRS instruction is issued to load the RS with all interrupted context values. The original first BSPSTORE is restored from the preserved BSPSTORE.

15 Claims, 13 Drawing Sheets

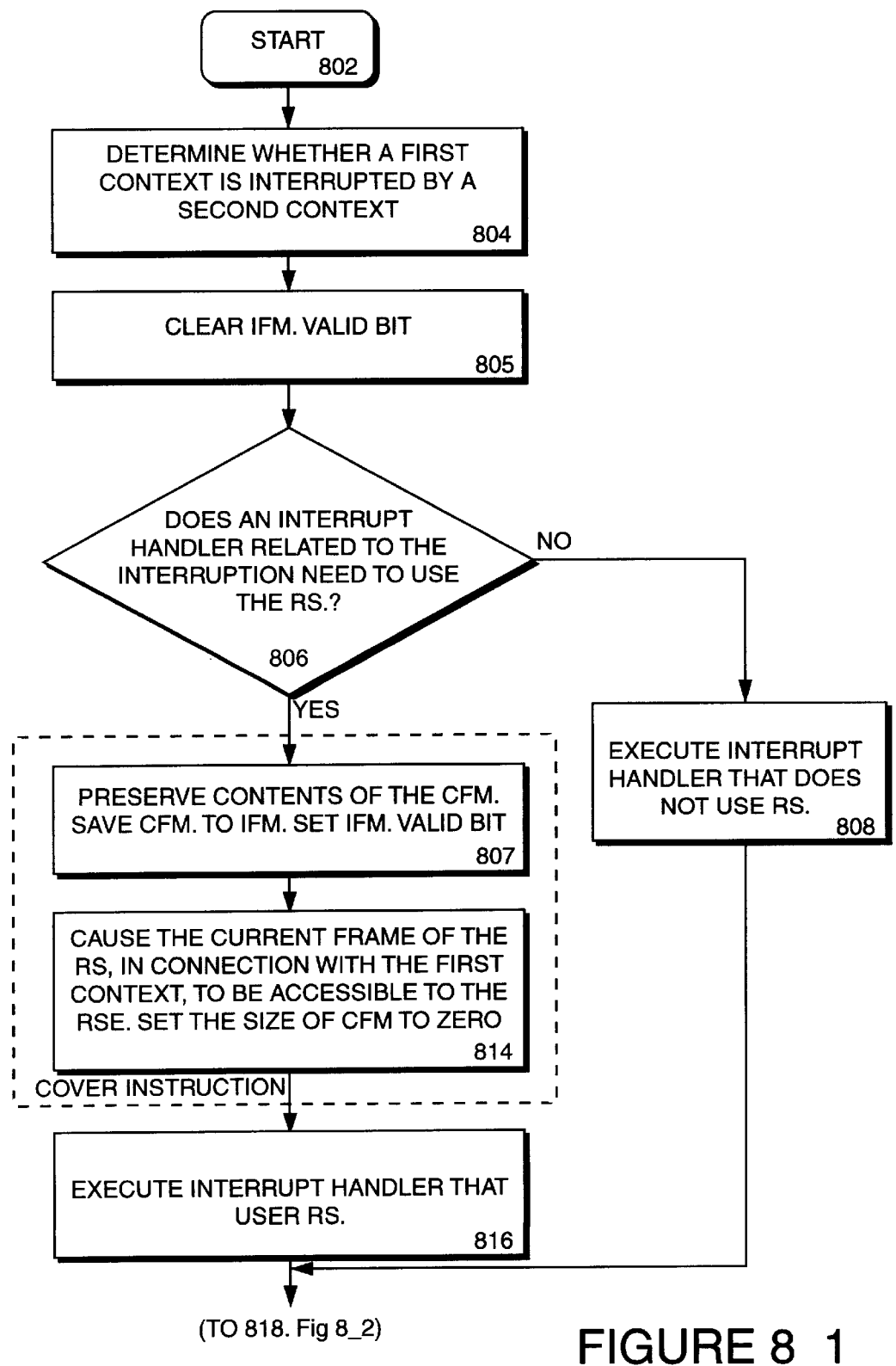
FIGURE 8_1

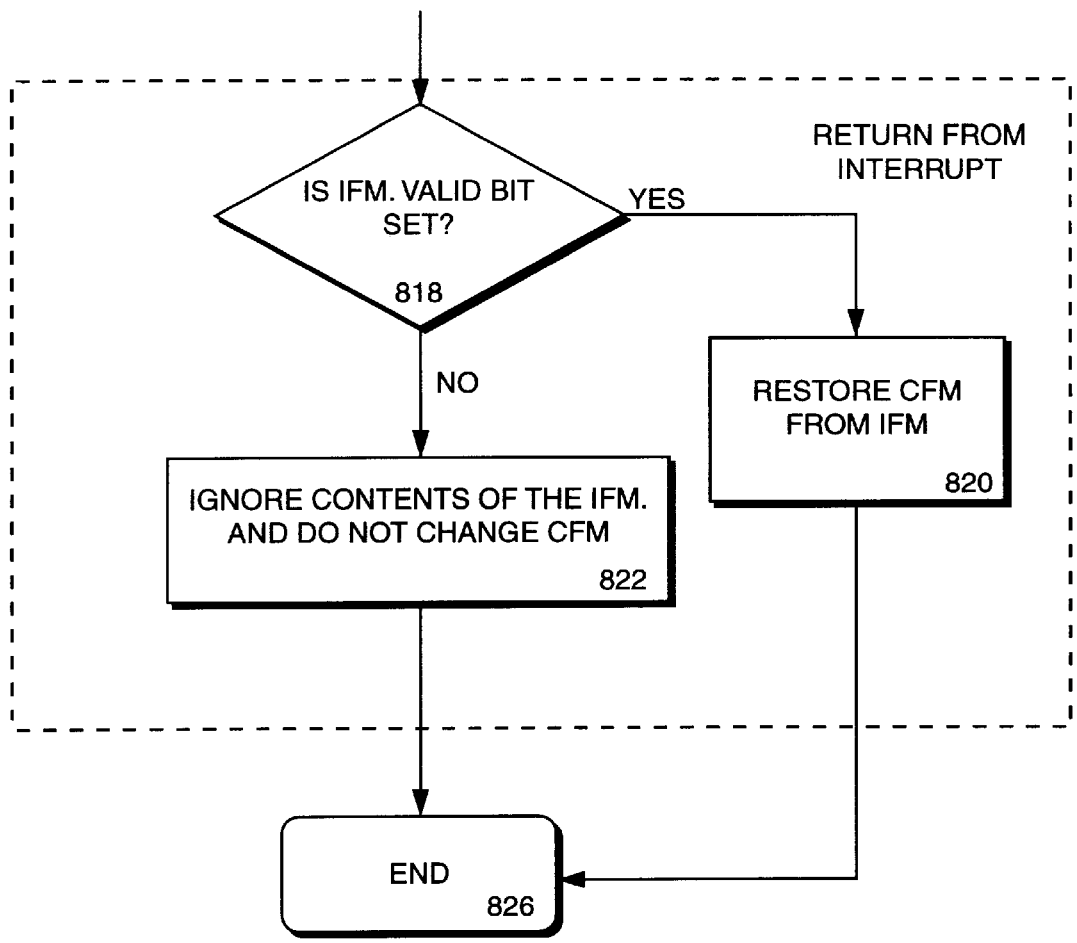
FIGURE 8_2

CODE SEQUENCE FOR ASYNCHRONOUS BACKING STORE SWITCH UTILIZING BOTH THE COVER AND LOADRS INSTRUCTIONS

BACKGROUND OF THE INVENTION

(1) Field of the Invention

The present invention relates to the field of microprocessors. More specifically, the present invention relates to register stacks in microprocessors.

(2) Description of Related Art

A register stack architecture allows multiple procedures to efficiently share a large register file, by stacking procedure call frames in registers. Registers may be used by procedures for holding intermediate results, address indexing, passing parameters between calling and called procedures such as subroutines, etc.

In most modern microprocessor architectures with "non-stacked register architectures" the overhead of saving and restoring registers on procedure calls and returns limits the performance of a microprocessor or computer system. Since the call/return patterns of typical applications exhibit high call/return frequencies with small amplitudes, the hysteresis of a stacked register file causes a significant reduction in the number of stores at procedure calls (register spills) and loads at procedure returns (register fills). As processor frequency is increasing (access to processor faster) and access time to random access memory (RAM) is decreasing, but not as much as processor frequency is increasing reducing the number of memory accesses performed by a program will result in performance improvement in most computer systems.

While register stacking removes the number of register spill/fill operations, programs with deep procedure call chains may exhaust available registers—procedure calls may cause register stack overflows, while returns may cause underflows. Traditional processor architectures define over/underflow traps that vector to software overflow/underflow handlers to spill or fill registers in order to make room in the register stack. However, these techniques may slow down execution of programs which may need to stop to allow the overflow/underflow handlers to do their job.

Consequently, it is desirable to provide an apparatus and a method that uses excess processor memory bandwidth to dynamically spill/fill registers from the stacked register file to a backing store in memory concurrently with program execution such that spilling or filling may operate in parallel with the processor's execution of instructions. In such an environment it is desirable to provide a way of "synchronizing" spilling and filling of registers with a processor's execution of instructions when a switch from a source to a target context is required to make possible a return to the same context and resume operation in the source context as if no context switch occurred. It is also desirable to provide a way of saving and restoring, in an efficient manner, the contents of stacked registers of the stacked register file upon interrupt and return from interrupt, respectively.

SUMMARY OF THE INVENTION

The present invention provides a computer implemented process for switching from an interrupted context to an interrupting context in a processor. The processor includes a register stack (RS) that has first and second portions. The processor includes a register stack engine (RSE) that exchanges information, in one of instruction execution dependent and independent modes between the second portion and a storage area. The method includes the following steps: (a) a state of the RSE of the interrupted context is preserved; (b) a COVER instruction is issued; (c) a first pointer (BSPSTORE) is preserved, the first pointer points to a location in the storage area, of the interrupted context, where a next register of the second portion is to be written; (d) first pointer (BSPSTORE) is written with a value corresponding to the interrupting context; and (e) a second pointer (BSP) is preserved, the first and second pointers define the storage area in the interrupting context.

BRIEF DESCRIPTION OF THE DRAWINGS

The features, aspects, and advantages of the present invention will become more fully apparent from the following Detailed Description, appended claims, and accompanying drawings in which:

FIGS. 8-1, 8-2 illustrates a flow chart diagram in connection with process for switching contexts triggered by a COVER instruction in accordance with one embodiment of the present invention;

DETAILED DESCRIPTION

In the following description, numerous specific details are set forth to provide a thorough understanding of the present invention. However, one having ordinary skill in the art should recognize that the invention can be practiced without these specific details. In some instances, well-known circuits, structures, and techniques have not been shown in detail to avoid obscuring the present invention.

A. Register Stack and Register Stack Engine

Figure 1:
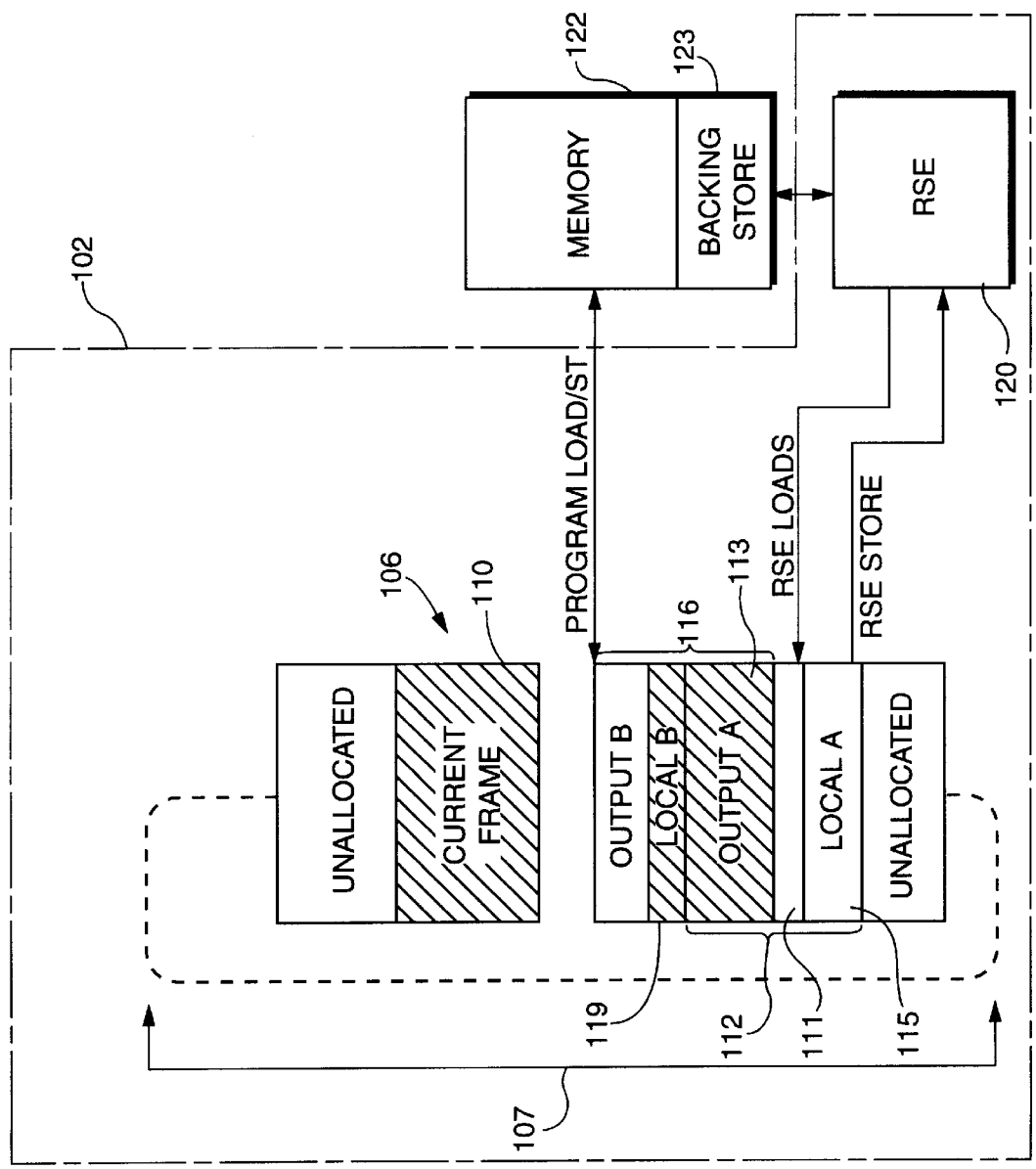
FIG. 1 illustrates a block diagram of a microprocessor that incorporates a register stack architecture in accordance with one embodiment of the present invention.

FIG. 1 illustrates a block diagram of a microprocessor 102 (shown in dotted lines) that incorporates a register stack architecture. Microprocessor 102 includes a register stack (RS) 106 and Register Stack Engine (RSE) 120 coupled thereto. RS 106 may be used, by way of example, for storing in stacked registers included therein parameters and other values belonging to different procedures that are executed by microprocessor 102. In the description presented herein the term "store" in connection with the RS 106 refers to electrically preserving a digital signal that represents a binary value. RS 106 is coupled to a memory 122 that includes a storage area (backing store 123). Backing store and 123 may store therein the content of specific registers of RS 106 when certain events occur, such as when RS 106 does not have sufficient space (registers) left for storing data in connection with certain procedures upon occurrence of a procedure call.

A register stack architecture allows multiple procedures to efficiently share a large register file (RS 106), by stacking procedure call frames, such as procedure frame 112, in registers. As the frequency of processors typically grows faster than access time to memory, a register stack architecture helps reduce the number of memory accesses that may need to be performed by a processor executing a program that includes a number of procedures.

Register stack 106 includes a variable of number of general registers that are available to all programs for computation at all privilege levels. In one embodiment of the present invention described herein, RS 106 includes a minimum of 96 65-bit general registers. Each general register may typically include a number of bits for data storage and another number of bits to encode attributes of the data. In one embodiment according to the present invention, each generation register has 64 bits of normal data storage plus attributes. In the particular embodiment of microprocessor 102 each general register has an additional bit, NAT (Not a Thing) which provides information that indicates that a deferred exception occurred and is recorded.

The set of general registers is partitioned into two subsets: a first subset (static subset) (not shown) that is software visible (available) to all procedures and includes a number of general registers; and a second subset 107 (stacked subset) that includes registers denominated stacked general registers. The stacked subset 107 is not software visible to all procedures. Rather, stacked subset 107 includes one or more groups of consecutive stacked registers that may be made available to a procedure by executing an ALLOCATE instruction resulting in allocation of a register frame 112. An ALLOCATE instruction (hereinafter referred to as "ALLOC") specifies the number of registers a callee expects to use. Each register frame 112 includes at least one register 111 (typically a plurality of consecutive registers) that stores data in connection with a respective procedure associated with that register frame. Data stored in the at least one register 111 may include the parameters of the respective procedure, for example, but is not limited thereto. The plurality of consecutive registers 111 includes a programmable number of local 115 and output 113 registers that make up one frame. Output registers 113 of register frame 112 include registers that may be shared with called procedures while local registers 115 include registers that may not be shared with called procedures.

For example, output registers 113 of register frame 112, that corresponds to procedure A (caller procedure) may be shared with a local portion 119 of frame 116 corresponding to procedure B (callee procedure). Sharing the output registers 113 of procedure A's register frame 112 with the callee procedure B is made possible without the need to save procedure A's registers to memory 122 and restore these registers from memory 122. Access to the output registers of procedure A by the callee B is provided by renaming virtual register identifiers, included in instructions, into physical register identifiers.

Register stack 106 further includes a current frame 110. A current frame is defined as a set of architected registers, visible to software, i.e., that may be read from and written to by software. Software, however, may not write outside the current frame. The current frame 110 is configured to move "up" (towards the top part of the figure) if there is a call to a procedure. The current frame 110 is configured to move "down" (towards the bottom part of the figure) if there is a return from a procedure call. Reading a stacked register outside the current frame may return an undefined result. Writing a stacked register outside the current frame may cause an illegal operation fault.

Each register frame 112 of a procedure has associated therewith a frame marker (not shown) that stores the state of the respective register frame. The frame markers include information relating to the sizes of the local and output portions of a frame. For example, a frame marker may include information related to the size of frame (sof) which provides a measure of the number of registers included in the register frame. A frame marker may also include information related to the size of local registers (sol) which provides a measure of the number of local registers of the register frame.

The frame marker of a current frame is called a current frame marker (CFM) and is stored in a dedicated register. On a call from a procedure the content of the CFM is saved by copying it to a previous frame marker (PFM) field in a previous function state (PFS) register (not shown). PFS includes therein multiple fields, such as the PFM field that includes values which are copied automatically from CFM on a call from a caller procedure.

Upon a call to a procedure, the current frame moves "up" in the RS 106 capturing a number of registers of RS 106 to be used by the callee. However, if register stack 106 does not include sufficient registers available for the callee (stack overflow), microprocessor 102 is stalled until a register stack engine (RSE) 120, saves to memory 122 sufficient registers of RS 106 thereby providing more available registers to RS 106. RSE 120 is a specialized hardware circuit that may use excess memory bandwidth in memory 122 to dynamically store (spill) registers, from outside the current frame 110 of RS 106, to a backing store portion 123 located in memory 122 concurrent with the processor's execution of instructions (program execution). RSE 120 is also configured to restore (fin) registers from the backing store 123 to RS 106 concurrent with program execution. At return from a procedure some of the caller's registers may have been saved by RSE 120 to backing store 123 but not yet restored (stack underflow). In this case, a return instruction causes stalling of microprocessor 102 until RSE 120 may restore an appropriate number of caller's registers.

While the static subset must be saved and restored at procedure boundaries according to software convention, the stacked subset is automatically saved and restored by RSE 120 without explicit software intervention. RSE 120 utilizes register frame information to save and restore registers from RS 106 to backing store 123 at the best opportunity independent of instruction execution in the callee and caller procedures.

B. Register Stack and Procedure Calls

Figure 2:
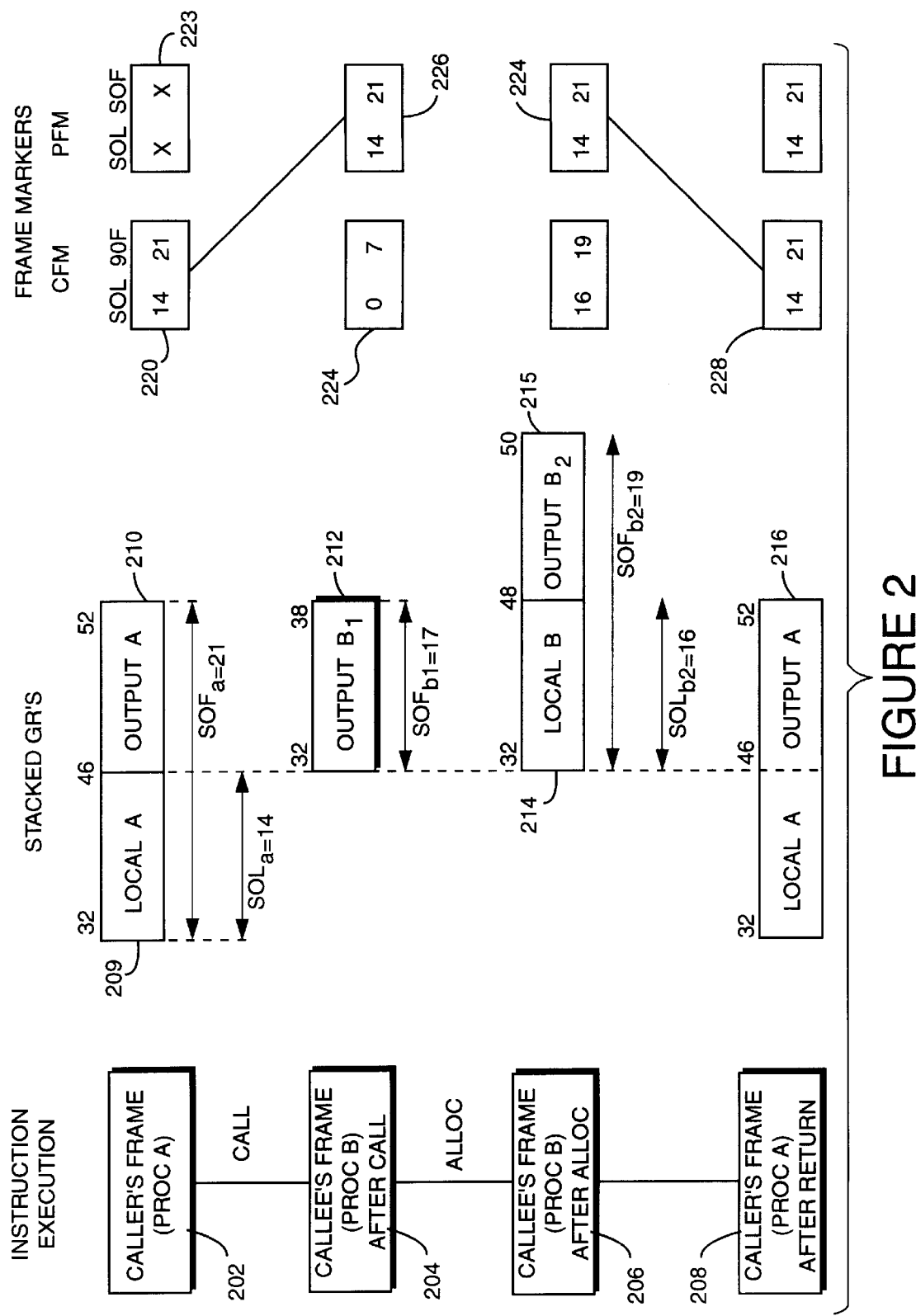
FIG. 2 illustrates a block diagram with states of a register stack for a procedure call from a first procedure to a second procedure in accordance with one embodiment of the present invention.

FIG. 2 illustrates in block diagram form the state of a register stack (RS) for a procedure call from procedure A (caller) to procedure B (callee). The state of the RS is shown at four points: prior to the call (state 202), immediately after the call (state 204), after procedure B has executed an ALLOCATE instruction (state 206), and after procedure B returns to procedure A (state 208). As a consequence of a procedure call, a Current Frame Marker (CFM) 220 is copied (in this example) to a previous frame marker (pfm) field, of a Previous Function State (PFS) register, to be later restored on return from procedure B to procedure A. At state 202, procedure A's frame is defined, in this example, by registers 32–52 and includes 21 registers, (a size of frame ($sof_A$) of procedure A is 21). According to this arrangement, registers 32–52 are visible to procedure A. The CFM 220 for procedure A includes the pair (14,21) where "14" denotes a size of locals (sol) of procedure A's frame and "21" denotes the size of frame ($sof_A$) for procedure A. The pfm information 223 of this state is "don't care".

After a "call" by procedure A to procedure B, the RS "passes" to state 204. As a consequence of the "call," the CFM information 220 is copied to pfm field 226. After the contents of CFM 220 have been copied to pfm 226, a new value is written to CFM 224 creating a new current frame, in this example, with no locals (0 registers) and with a set of output registers (7 registers) which are caller A's output registers. The stacked registers are renamed such that, a first register in caller A's output area (register GR46) becomes GR32 for the output area of the callee B's register frame. In this way, the output area of the caller A is made visible to the callee B that knows that its registers start from GR32. The size of callee B's local area is set to 0 in CFM 224. The size of callee B's frame ($sof_{B1}$) 212 is set to the size of the caller's output area 210 equal to ($sof_A$–$sol_A$). In this way caller A's output area overlaps with callee B's output area thereby making caller A's output area visible to callee B. This overlap permits parameter and return value passing between procedures A and B.

At state 206 the local and output areas are resized using an ALLOC instruction. The CFM may not be directly accessible to software and, in application programs, is updated through the execution of calls, returns, ALLOC, etc. The majority of application programs need only issue ALLOC instructions and save/restore the pfm field to effectively use the register stack. ALLOC specifies values that determine the size of frame (sof) and size of locals (sol) to insure availability of registers in the current frame for the callee. Procedure B's frame is thus dynamically resized for local area 214 and output area 215 by issuing the ALLOC instruction. After the issuance of ALLOC, at state 206, the first seven registers of callee B's local area 214 have the same content as the content of the seven registers found in caller A's output area 210. After a return, at state 208, CFM 228 of procedure A is restored from PFS.pfm field 224 of procedure B. Also, register renaming is reset to the caller A's configuration, i.e. the local registers for procedure A are renamed to 32–45 and the output registers for procedure A are renamed to 46–52.

C. Register Stack and Backing Store

Figure 3:
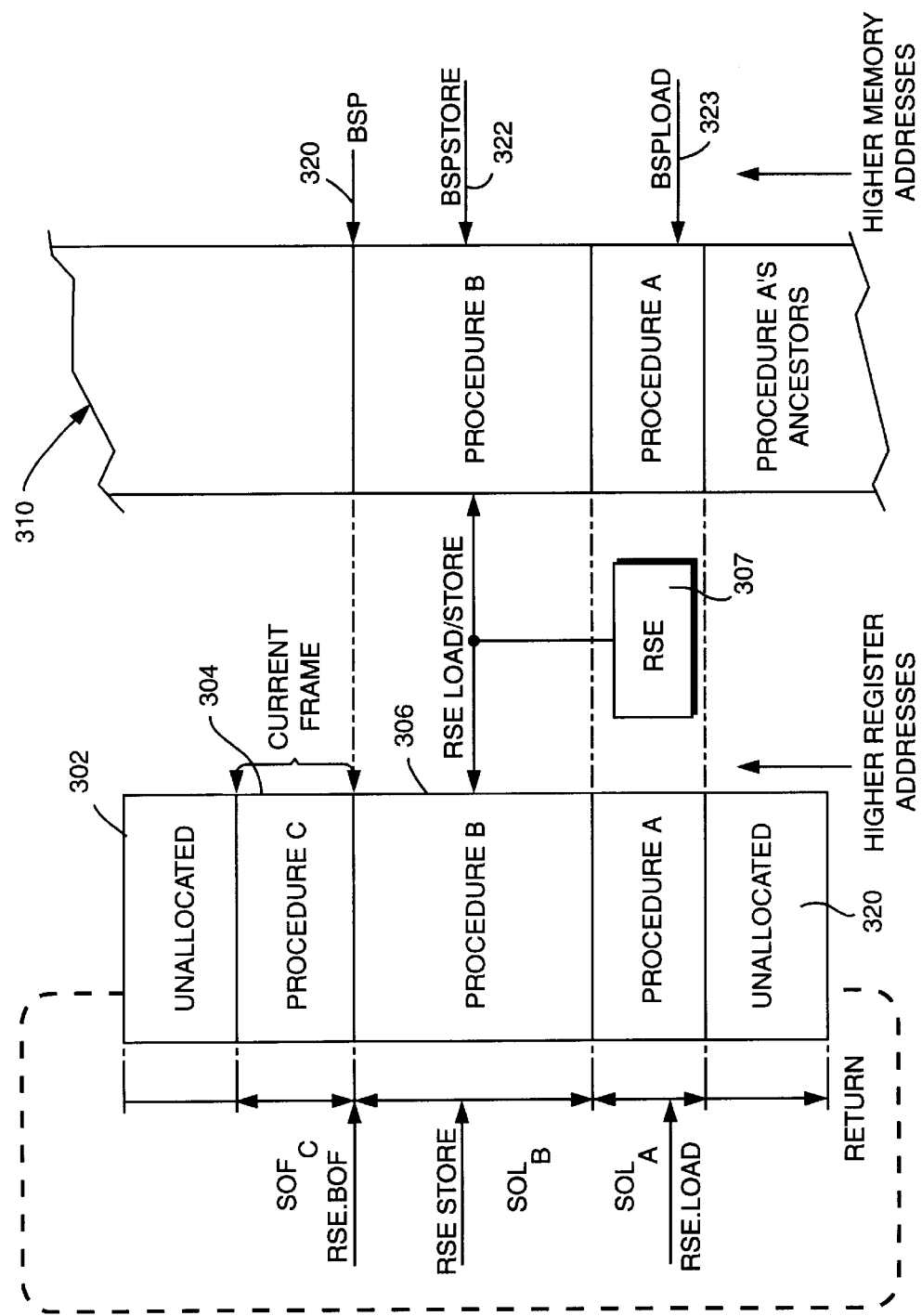
FIG. 3 illustrates a block diagram of a register stack and of a backing store portion of a storage device in accordance with an embodiment of the present invention.

FIG. 3 illustrates a block diagram of a register stack (RS) 302 and of a backing store portion 310 of a storage device (hereinafter referred to as "backing store"). Register frames 306 are mapped onto a set of physical registers in the RS 302 which operates as a circular buffer containing most recently created frames. When a current frame 304 moves down as a result of a return from a procedure, then registers beyond the current frame (above in FIG. 3) are not allocated. Such unallocated registers have a circular configuration as shown in the figure. The circularity of the RS 307 is related to the renaming mechanism implemented by the processor according to the present invention.

RSE 307 may operate (perform stores and loads) on all parts of RS 302 outside current frame 304. The registers shown below current frame 304 include the frames of the parent procedures (procedures A and B in the figure) of current frame 304 that corresponds to procedure C.

Backing store 310 is configured to store local registers of each register frame. The output area of a register frame is not spilled to the backing store 310 (unless it later becomes part of the callee's local area). Within each frame, registers are organized such that lower address registers of a respective frame are stored at lower memory addresses of backing store 310. Backing store 310 is organized as a stack in a memory that grows from lower to higher memory addresses in the direction of the arrow illustrated at the bottom-right part of FIG. 3. In another embodiment of the present invention, backing store 310 may store the content of registers of the RS at addresses that grow in the direction opposite the arrow illustrated at the bottom-right part of FIG. 3.

The RS includes one portion (dirty partition) that stores dirty registers. Dirty registers are defined as registers from previous stack frames of the RS that have not been saved to the backing store. The backing store is implemented to store consecutive dirty registers in the order these dirty registers are stored in the RS. Backing store 310 is defined by backing store pointer 320 stored in a backing store pointer register (BSP) and a backing store pointer for store operations (BSPSTORE) 322 stored in a BSPSTORE application register. The backing store pointer (BSP) defines a top of the backing store, i.e., the highest address below which RSE stores dirty registers belonging to the stacked subset of RS 302. BSP is an application register that is visible to software. The BSPSTORE application register contains the address (BSPSTORE pointer), of a memory location in backing store 310 where a next stacked register of RS 302 is spilled by RSE 307. BSP and BSPSTORE define a portion in the backing store where remaining dirty registers from the RS can be stored. The addresses included in both BSP and BSPSTORE registers are aligned to an 8-byte boundary. The microprocessor according to the present invention further includes a register called Backing Store Pointer for Load operations (BSPLOAD) 323. BSPLOAD includes a pointer to a location in the backing store from which RSE performs load operations.

There are a number of physical register pointers (physical register numbers) that correspond to the Backing Store Pointers explained above. For example, RSE.BOF corresponds to BSP and it represents the bottom of the current frame or, more specifically, the physical register number of the first register in the current frame adjacent to the border between the dirty partition and the current frame. A value RSE.Storereg is defined as the physical register number of next register to be stored by the RSE in the backing store. RSE.Storereg corresponds to BSPSTORE. The physical register corresponding to BSPLOAD is called RSE.Loadreg and is the register adjacent to the next physical register to be loaded by the RSE. RSE.BOF, RSE.Storereg, RSE.Loadreg are called RSE internal state elements. These elements are not directly exposed to the programmer as architecturally visible registers. As a consequence, RSE internal state does not need to be preserved across context switches or interruptions. Rather, RSE internal state is modified as a side effect of register stack related instructions. For example, RSE.BOF may change as a result of a CALL instruction. In the following discussion, the embodiments of the present invention disclosed herein are discussed in connection with backing store pointers, such as BSP, BSPSTORE, etc. The present invention, however, may also by implemented in connection with physical register numbers such as RSE.BOF, RSE.Storereg, etc.

The RSE is configured to spill information independent of instruction execution, in conjunction with locations in the backing store that have addresses lower than BSP but higher than backing store pointer for store operations (BSPSTORE) 322. The RSE is also configured to fill (load) registers in the RS with information that resides in the memory location where BSPLOAD 323 points.

Figure 4:
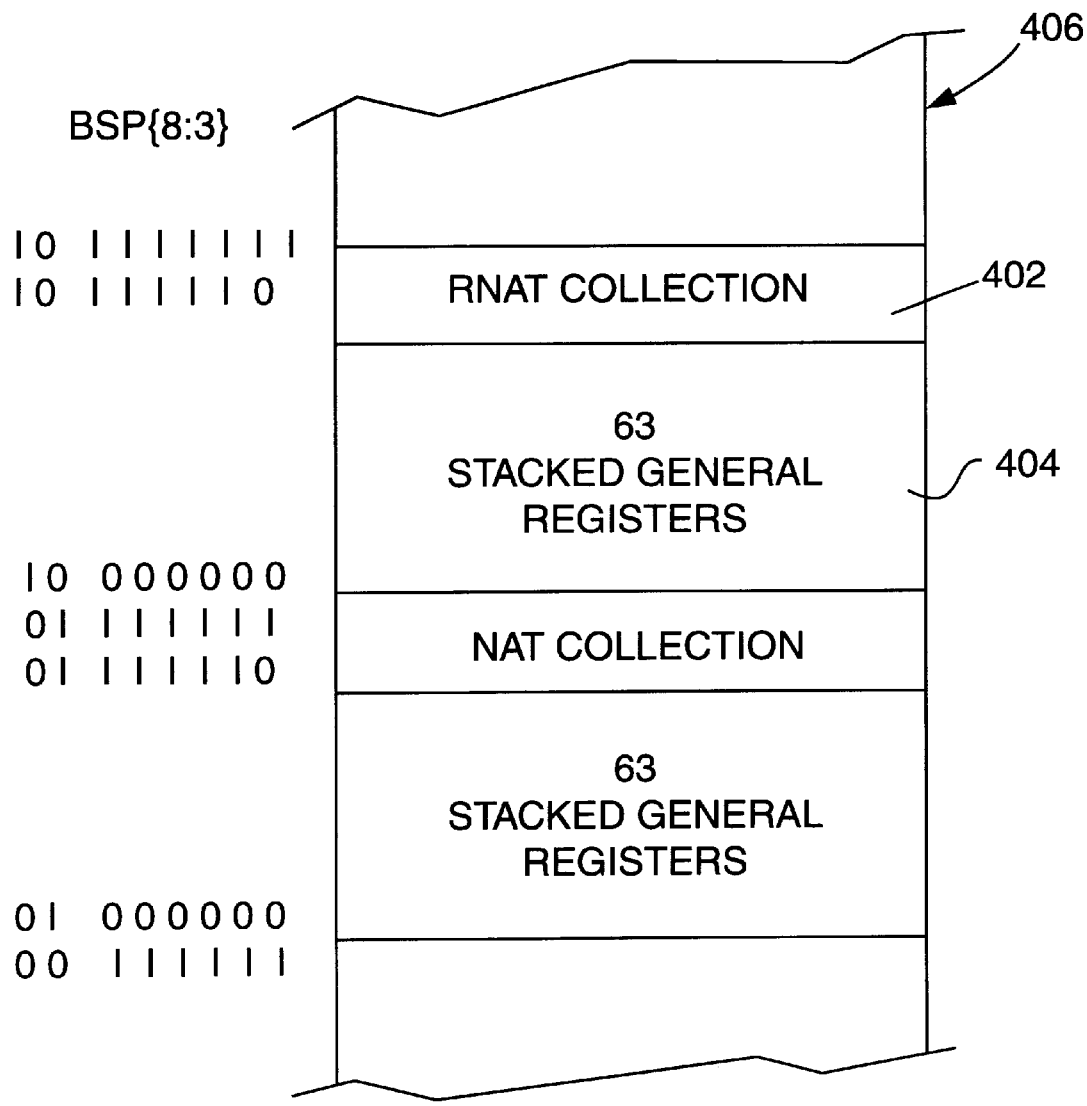
FIG. 4 illustrates a block diagram of a portion of the backing store in accordance with one embodiment of the present invention.

RSE 307 also spills/fills NAT bits corresponding to the stacked registers. The NAT bits for the stacked subset are spilled/filled in groups of 63 as shown in FIG. 4. A NAT bit is a bit associated with a corresponding one of the stacked registers stored in RS 302, and indicates whether the content of the respective register is valid or not. When RSE spills a register to the backing store, the corresponding NAT bit is copied to a RNAT application register which is a 64-bit register, that stores a collection of NAT bits for 63 consecutive registers. Whenever bits 8:3 of BSPS are all "1"s, the RSE stores the RNAT register to backing store 406.

Figure 5:
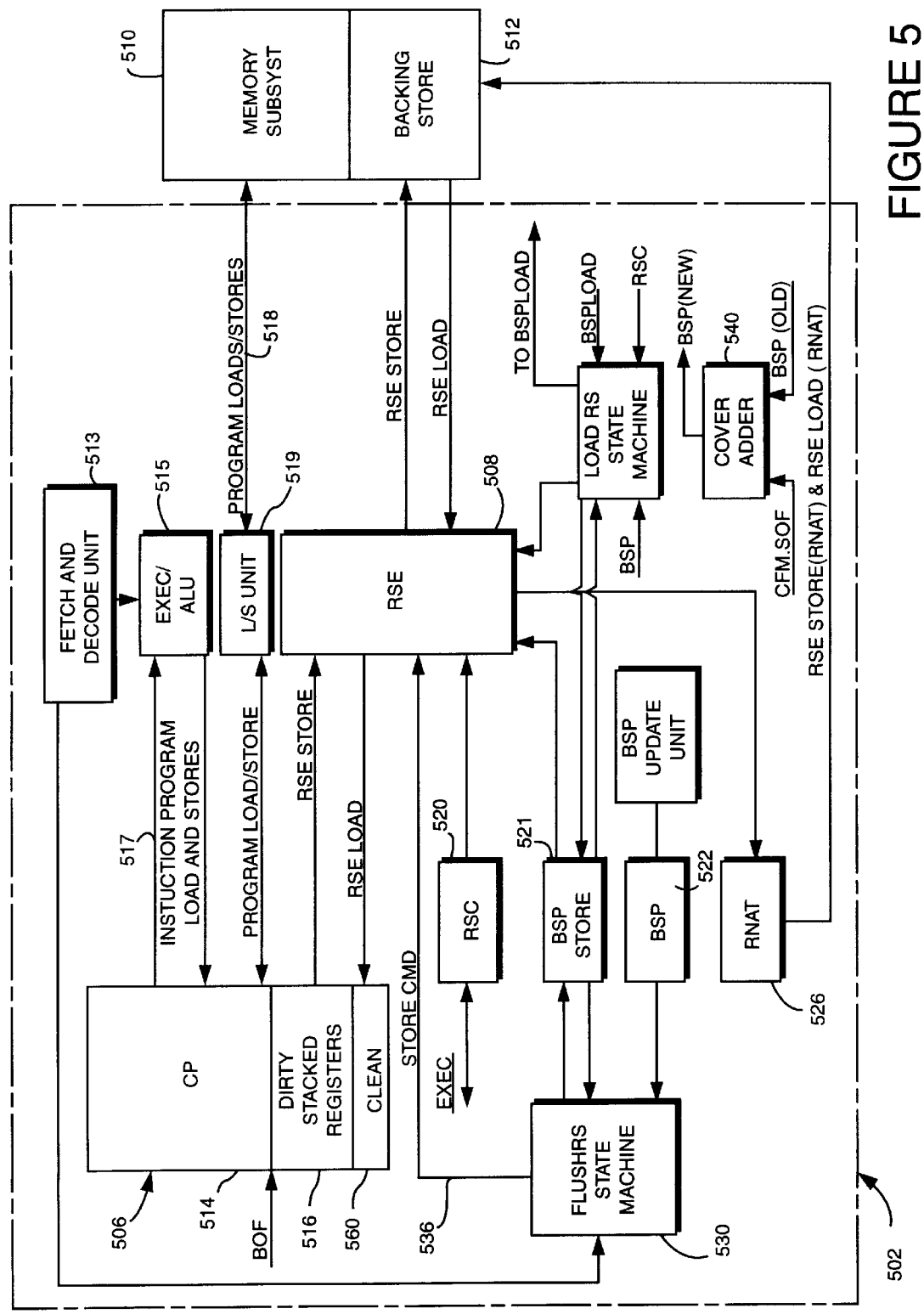
FIG. 5 illustrates a block diagram of a microprocessor configured in accordance with one embodiment of the present invention.

D. Block Diagram of a Microprocessor According to One Embodiment of the Present Invention FIG. 5 illustrates a block diagram of a microprocessor 502 according to the present invention. Microprocessor 502 includes a register stack 506. Register stack 500 includes a portion thereof allocated for a current frame 514 and a portion thereof allocated for dirty register subset 516 (hereinafter referred to as "dirty subset"). Dirty subset 516 includes a plurality of registers that may be spilled to a backing store portion 512 of a memory subsystem 510. The registers of the stacked subset 516 may also be filled with information from backing store 512 via a register stack engine (RSE) 508 that is coupled to both backing store 512 and the stacked subset 516.

Microprocessor 502 executes a programmed stream of instructions that initially are stored in memory subsystem 510. Instructions from memory subsystem 510 may be driven to an instruction cache that may be included in a fetch and decode unit 513. The fetch and decode unit 513 receives an instruction pointer from an instruction pointer generator (not shown) based on which it fetches an instruction from the instruction cache to an EXECUTION/Arithmetic Logic Unit (ALU) 515. Execution/ALU unit 515 is coupled to register stack 506 via line 517. Some of the instructions fetched to the EXECUTION/ALU 515 may be instructions related to a caller or a callee procedure.

Typically, upon a procedure call, the parameters of a caller procedure are stored in register stack 506. Upon occurrence of certain conditions, such as stack overflow, data stored in RS 506 is saved to memory subsystem 510 to be preserved for further later usage. Data within stacked subset 516, outside the current frame, is typically saved to backing store 512 of memory 510 by way of Register Stack Engine (RSE) 508. Data included in current frame 514 may be stored to memory 510 or loaded from memory 510 by way of load/store unit 519, which performs program load and store operations with respect to procedure related information. The load/store unit 519 is controlled by the software which has "visibility" into the current frame.

RSE 508 operates concurrently with program execution by performing spills from stacked subset 516, outside the current frame, to backing store 512 and fills from backing store 512 to a portion 518 of the stacked subset allocated for clean registers. Clean registers are defined as registers that contain values from previous register frames that have been previously stored in the memory. The operation of RSE 508 is controlled by a register stack configuration (RSC) application register 520 which is coupled to RSE 508. RSC 520 includes two mode bits that determine the mode of the RSE. Bit zero of the RSC mode enables eager RSE stores and bit one enable eager RSE loads. When RSE 508 operates in an "eager" mode, RSE 508 performs register spills and fills independent of instruction execution. An eager mode is defined as a mode where RSE performs spills or fills operation in a speculative fashion. RSE, when acting speculatively, saves and restores registers ahead of time, i.e., before the software "tells" the RSE to perform saving or restoring of registers. In an eager mode, the RSE can perform load and stores operation without stalling the processor. When both mode bits are zero (enforced lazy mode), RSE 508 issues mandatory loads and stores, i.e., RSE 508 spills and fills registers only when it is required to do so by the software. Contrasted to the eager mode in the lazy mode, the RSE acts (spills and fills registers) only if an overflow or underflow occurs. RSE 506 may be controlled at all privilege levels by way of several instructions and by accessing four application registers: RSC 520, BSP 522, BSPSTORE 521 and RNAT 526.

Furthermore, processor 502 includes a FLUSHRS state machine 530 coupled to the Fetch and decode unit 513. FLUSHRS state machine 530 causes flushing to the backing store 512 of the subset of dirty registers 516 stored in RS 506 once a FLUSHRS instruction is fetched and decoded by Fetch and decode unit 513. When a FLUSHRS instruction is encountered in the instruction stream, the FLUSHRS state machine 530 asserts a STORE CMD signal to RSE 508 via line 536. The STORE CMD signal instructs RSE 508 to spill to backing store 512 all dirty registers located in stacked subset 516 (dirty partition) of RS 506.

The FLUSHRS instruction may be used to synchronize software with the contents of the register file and the state of the backing store 512 located in memory 510. Such synchronization occurs in certain circumstances before a switch from one context to another. Synchronization is critical to allow operation of the RSE in the eager mode. When RSE operates eagerly, software does not know what is the number of dirty registers currently in the register stack. Upon execution of the FLUSHRS instruction, instruction execution is stalled while the RSE 508 stores all dirty registers to backing store 512.

Figure 6:
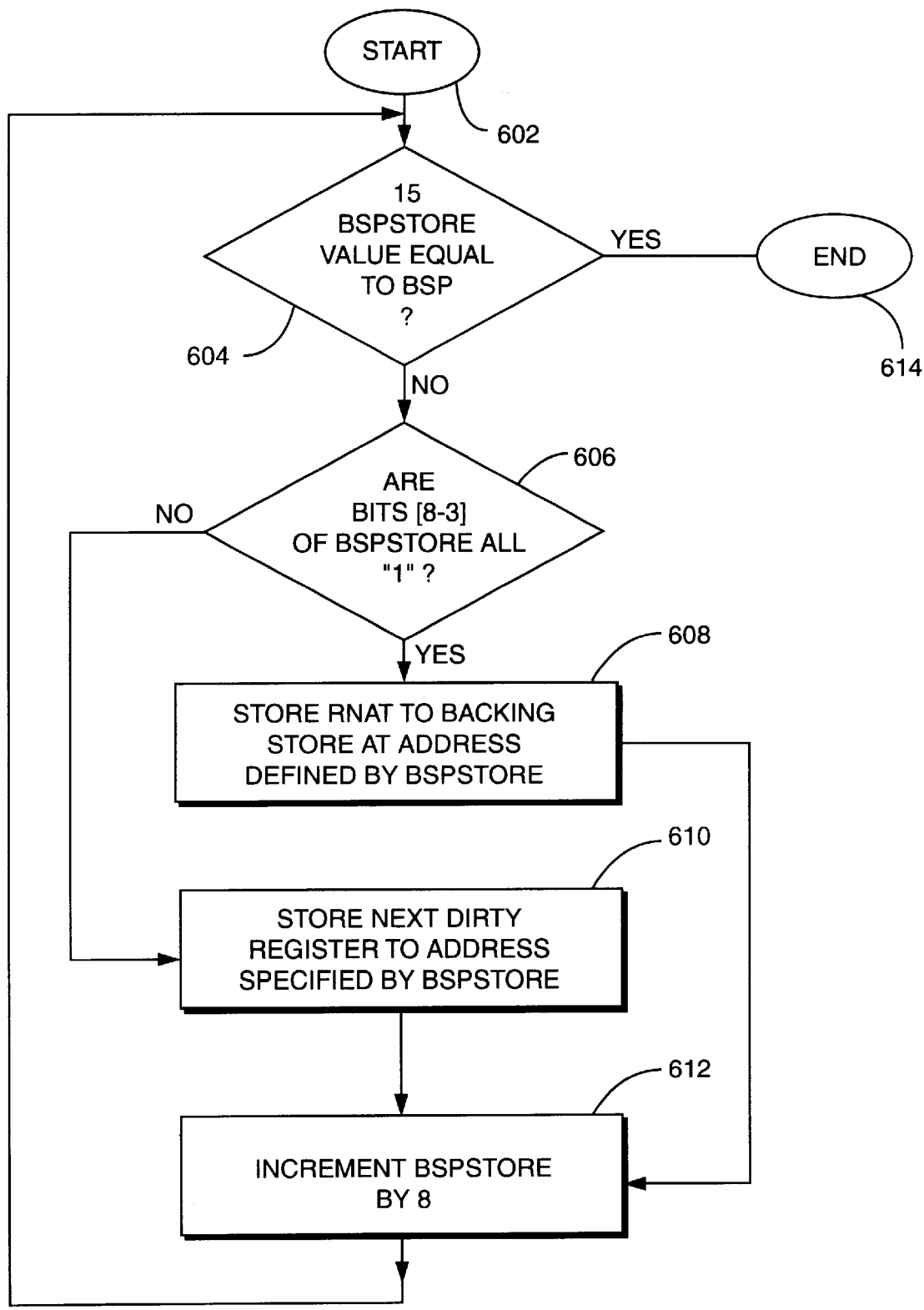
FIG. 6 illustrates a flow chart in connection with a process for flushing a register stack using a FLUSHRS instruction according to one embodiment of the present invention.

E. Process for Flushing a Register Stack According to One Embodiment of the Present Invention FIG. 6 illustrates a process for flushing a register stack (RS) device according to the present invention. This process is triggered when a FLUSHRS instruction is encountered in the instruction stream. The FLUSHRS instruction is a novel instruction that is typically inserted in a stream of instructions to cause saving of all dirty registers from the register stack to the backing store, thereby contributing to a synchronization of the RSE with the processor's execution of instructions, which will be explained later in this section. The process for flushing a RS device, described in connection with the flow chart illustrated in FIG. 6, may be performed in connection with a processor that includes a register stack (RS) device that is in a first state characterized by the RS configured to store in its registers information related to a first context. The processor is configured to execute instructions in connection with the first context. The processor further includes a register stack engine (RSE) in a first state. The RSE is configurable to exchange information between the RS and the storage area independent of instruction execution. The present invention also applies to embodiments where the RSE exchanges information between the RS and the backing store as a result of execution of instructions, i.e., dependent of instruction execution. The RSE is thus configurable in one of an instruction execution dependent and independent modes. The storage area (hereinafter referred to as backing store) is a storage portion in a memory device dedicated for storing information related to the first context which in most cases comprises dirty registers.

The process for flushing the RS according to the present invention starts at step 602 when a FLUSHRS instruction is encountered in a stream of instructions that are executed by a processor. Execution of a FLUSHRS instruction causes the process to flow to decision block 604 where it is determined whether the values, stored in BSP and in BSPSTORE have a predetermined logical relationship relative to each other. In the embodiment of the process described in connection with FIG. 6 the predefined logical relationship between BSP and BSPSTORE is that BSP equals BSPSTORE. Accordingly, at block 604, BSP and BSPSTORE are checked to determine whether they are equal.

If at block 604 it is determined that BSP equals to BSPSTORE, the process ends at block 614. However, if BSP and BPSTORE are not equal, which means that not all of the dirty registers of the RS have been saved to the backing store, the process flows to decision block 606. At decision block 606 it is checked whether a predetermined number of bits of BSPSTORE are all asserted (i.e., logic "1") to determine whether RNAT should be saved to the backing store. In one embodiment of the process according to the present invention the process determines whether bits 8–3 of BSPSTORE are all asserted but the present invention is not limited in scope to this implementation. As one may see in the implementation of the backing store described in connection with FIG. 4, RNAT collections are stored at the address indicated by the BSPSTORE, when bits 8–3 of the BSPSTORE address are asserted. This indicates that RNAT collections are saved after 63 consecutive dirty registers have been saved to the backing store.

However, if at decision block 606 it is determined that bits 8–3 of BSP are not all asserted, which means that the RSE has not completed the spilling of 63 consecutive dirty registers to the backing store, the process flows to block 610 where RSE stores a next dirty register to an address specified by BSPSTORE. The process then flows to block 612 where BSPSTORE is incremented to point to a next location in the backing store. In the embodiment of the present invention described herein BSPSTORE is incremented by "8" bytes as the size of the registers is 64 bits. Note that while the present invention is discussed in connection with a 64-bit processor, the present invention applies to processors with other numbers of bits. Herein, the concept of incrementing of BSPSTORE by 8 bytes can be extended to a number of bytes that constitutes the size of the architecture implementing the present invention. The process may also arrive to block 612 from block 608, once RNAT has been saved to the backing store. The process further flows back (loops) to decision block 604.

The FLUSHRS instruction, which triggers the process explained in connection with FIG. 6 may be used for synchronizing the backing store memory image and the RSE with processor's execution of instructions (software). Since RSE is spilling and filling registers concurrently with processor execution (independent of processor's execution of instructions), a synchronization process may be needed when an operating system or user space thread switch routine needs to switch context from a source context to a target context.

F. Synchronous Backing Store Switch Process

Figure 7:
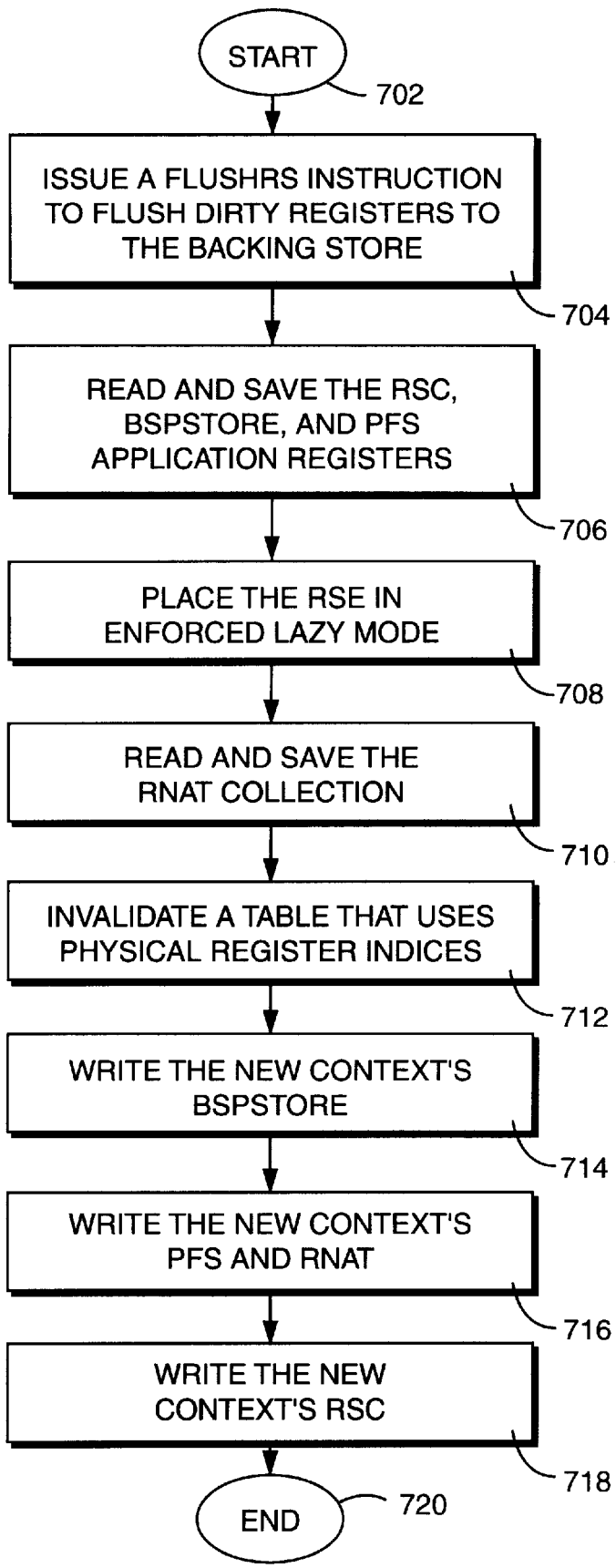
FIG. 7 illustrates a flow chart diagram in connection with a process for synchronous context switching using a FLUSHRS instruction in accordance with one embodiment of the present invention.

FIG. 7 illustrates a flow chart diagram in connection with a process (first process) for switching contexts according to the present invention. The process in connection with the flow chart diagram illustrated in FIG. 7 performs a synchronous backing store switch from a first context (source context) to a second context (target context). In the embodiments of the process of the present invention described herein, the synchronization process causes the information stored in the backing store to be synchronized with processor's execution of instructions (software). This process may be implemented as a code sequence that may be executed by a processor. The code sequence, among other things, causes the saving of a state of RSC, RS and RSE of the source context before the switch to the target context. When the processor has executed an arbitrary unknown number of instructions, (after the context switch) in connection with the target source, the dirty registers of the source context may, after the switch, be restored and loaded back into the register stack.

The process starts at block 702 from where it flows to block 704 where all the dirty registers, in connection with the first context, are saved from the RS to a first storage area (backing store). This is performed by execution of a FLUSHRS instruction. When a FLUSHRS instruction is executed, all dirty registers stored in the RS (previously unsaved), are flushed (saved) to the backing store. Saving the dirty registers to the backing store preserves the state of the RS in connection with the source context so that on return from the second context to the first context, software may reload registers of the source context into the RS from the backing store.

At block 706, the state of RS and RSE are preserved by reading and saving registers RSC, BSPSTORE and PFS. Because RSE related resources such as RSC, BSP, BSPSTORE and RNAT are architecturally visible and therefore are exposed to software as applications registers, these registers need to be preserved before the context switch from the source context to the target context. Typically, after the execution of the FLUSHRS instruction the content of BSPSTORE equals the content of BSP. Thus, saving BSPSTORE allows software to return to the address stored in the BSP. At state 706 register PFS is saved as its content may be altered by the saving of the current frame marker therein.

The synchronization step further includes the step of placing the RSE in enforced lazy mode at block 708. Since the RSE, when set in the eager mode, is spilling and filling registers, independent of instruction execution, software may not know the state of the RS and of the backing store with respect to the dirty registers stored in these devices at a given moment in time. RSE is placed in enforced lazy mode, by clearing certain bits in the RSC that indicate the mode in which the RSE is set. In enforced lazy mode RSE does not perform spills or fills independent of software.

At block 710, the RNAT application register is preserved to the memory for the purpose of preserving to the memory partial NAT collections to be later reloaded from the memory when returning to the source context. Since writing to BSPSTORE may cause the contents of the RNAT register to become undefined, software must preserve the contents of RNAT before writing to BSPSTORE.

The process then passes to block 712 where at least one table including information associated with physical registers number, is invalidated if the context switch causes program values to be placed in different physical registers. The process further loads, at block 714, a second state of the RS and RSE related to the second context (target context). This includes writing the BSPSTORE register with the BSPSTORE value for the second context. The BSPSTORE value for the second context is typically the BSP value for the second context. Further, at step 716 the second context's PFS and RNAT are written to update the current frame marker and the RNAT data in connection with the second context. Then, at step 718, second context's RSC register is written with control data in connection with the second context. This operation sets the mode (eager, lazy, etc.) in which the RSE is programmed.

G. Asynchronous Backing Store Switch Processes

1. Process Utilizing the Cover Instruction

FIGS. 8-1, 8-2 illustrates a flow chart diagram of an embodiment of a process for switching from a first context (context A or interrupted context) to a second context (context B or interrupting context) as a result of an asynchronous interruption. During an asynchronous interruption, the interrupted context is unaware of the interruption. "COVER" is a new instruction encountered in the stream of instructions that may be used when software, that is running in connection with a first context, is asynchronously interrupted. The interrupt causes an interrupt handler to take over the process. The interrupt handler uses the COVER instruction to synchronize with what RSE was doing before the interruption.

The process starts at block 802 from where it passes to block 804. At block 804, it is determined whether a first context is interrupted by a second context. When an interruption occurs, the current frame marker (CFM) remains unchanged and the processor marks an interrupt frame marker (IFM) register as invalid by clearing a IFM.VALID bit of the IFM. The IFM is a register that stores, upon certain conditions, (execution of COVER instruction for example) the content of CFM. The CFM defines the set of registers currently in use by software, i.e. that are directly controlled by the processor at a given point in time. All other stacked general purpose registers are controlled by the RSE. The process then flows to decision block 805 where the IFM.VALID bit is cleared.

At block 806 it is determined whether an interrupt handler in connection with the interruption of the first context, needs to create a new frame on the register stack (RS). If the interrupt handler is a "light-weight" interrupt handler that does not need to use the register stack, the process flows to decision block 808. At this block, the interrupt handler, that does not use the RS, is executed. Light-weight interrupt handlers may include Translation Lookside Buffer (TLB) miss handlers, speculation trampolines, deferred handlers, etc. The process then flows to decision block 818 where it is determined whether the IFM.VALID bit is set. If the IFM.VALID bit is set, the process flows to block 820 where CFM is restored from IFM. If at block 818 it is determined that the IFM.VALID bit is not set, the IFM contents are ignored and CFM remains unmodified.

However, if at decision block 806 it is determined that the interrupt handler needs to create a new frame on the registers of the RS, the process flows to block 807 where contents of the CFM are preserved to ensure that execution of the interrupt handler that uses RS does not destroy CFM. Accordingly, at blocks 807 and 814 the COVER instruction is executed. Execution of the Cover instruction causes copying the contents of the CFM to IFM and setting of the IFM.Valid bit. At block 814 the COVER instruction causes current frame of the RS, in connection with the interrupted context, to be accessible to the RSE. This is performed by allocating a zero size CFM thereby adding the current frame to the set of registers controlled by the RSE. This ensures that the portion of the RS (including the current frame) that was in use by the interrupted context may be saved so that the new context can use the RS. The allocation of a zero size of the CFM thereby adding the current frame to the set of registers controlled by the RSE is performed at a hardware level by adding to the old BSP, i.e., the BSP before the interruption, the number of registers included in the current frame, i.e., the number stored in the field CFM.SOF, plus the number of intervening NAT collections. A new BSP is thus obtained.

At block 816 the process causes execution of the interrupt handler that uses the RS. Before re-enabling interruptions, the handler saves the IFM to a general purpose register to save the interrupted CFM and to allow IFM to be further used by other subsequent interrupt handlers. After the execution of the interrupt handler at block 816 or block 808, the interrupt handlers complete by executing a return from interrupt (RFI) instruction. The RFI instruction causes inspection of the IFM.valid bit at block 818. If this bit is set, the process flows to block 820 where the CFM is restored from IFM by copying the IFM contents into the CFM. This restores the interrupted CFM, which may cause the RSE to load registers from the backing store, if needed. If the IFM.VALID bit is not set, the IFM contents are ignored and CFM remains unmodified at block 822.

In so treating light-weight interruptions, the embodiment of the process according to the present invention described herein provides capabilities including: high performance interruption handling, as light-weight handlers do not need to synchronize the RSE, and therefore to perform a COVER instruction; high performance of register spill/fill, since the RSE continues saving or restoring stack registers in the background throughout the light-weight interruption; and high performance of instruction emulation handlers (e.g. unaligned handlers) as access to the current frame is possible without being in control of the RSE.

FIG. 5 illustrates in block diagram form a COVER circuit 540 that is implemented by way of an adder. The adder receives at one input thereof a signal CFM.SOF and at another input thereof the BSP pointer (the old BSP pointer). A new BSP pointer is generated at the output of the adder circuit 540 by adding to the BSP pointer the size of the current frame that is included in the CFM.SOF field of the CFM register.plus the number of intervening NAT collections.

2. Processes Utilizing the LOADRS Instruction

There are a number of context switch events where a source backing store (context A) does not need to be accessed until execution of the target context (context B) completes. This is the most frequent form of context switch, which occurs in every system call. The source context in this case is the application stack and the target context is the operating system. These system call context events are sometimes referred to as domain crossing events (crossing from one privileged domain into another). Performance may be improved in connection with these types of context switch events by not flushing dirty registers to the memory when such domain crossing occurs. Upon a context switch, instead of writing all dirty registers to context A's backing store, by execution of a FLUSHRS operation, the source backing store is "torn" at a specified point (tear point). The tear point defines the dirty register written by the RSE to the source backing store (A) at a time when the system call occurs. A target stack, e.g., the operating system (context B), may be established in the RS to preserve therein remaining registers from context A, i.e. registers above the tear point, that would have been spilled to context A's backing store, had the context switch not occurred.

At context switch, the BSPSTORE's content in connection with the first context is saved to memory. A new address corresponding to context B's tear point is then written to BSPSTORE. When BSPSTORE is written with a new address room is automatically allocated on context B's backing store for dirty registers from context A. The memory area, defined by BSPSTORE and BSP (second backing store) in connection with context B is configured to store information related to context A by re-calculating a new BSP based on the new BSPSTORE and the number of dirty registers in the RS before the context switch.

Figure 9:
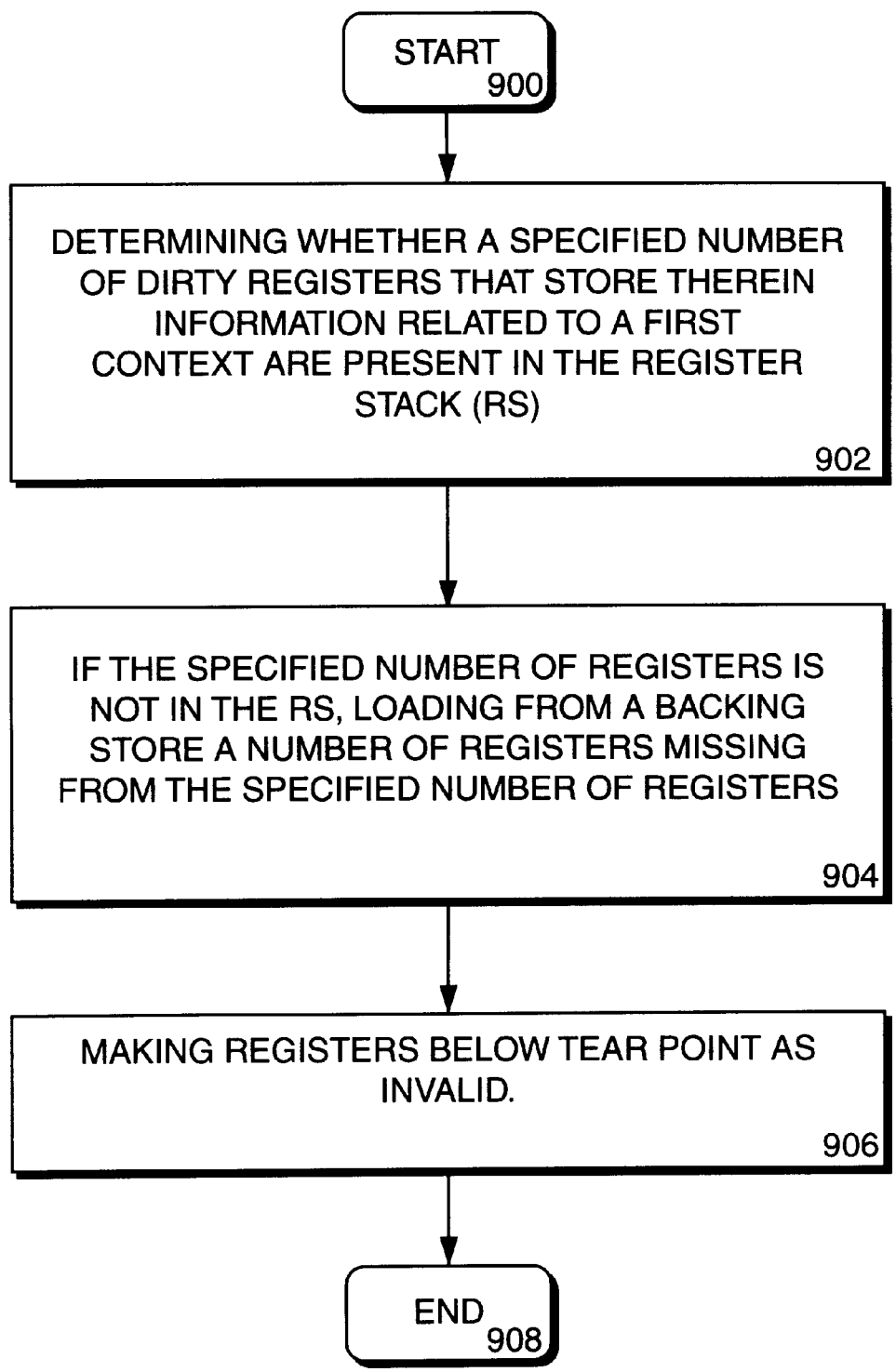
FIG. 9 illustrates a flow chart diagram in connection with a process for switching contexts triggered by LOADRS instruction in accordance with one embodiment of the present invention.

FIG. 9 illustrates a flow chart diagram in connection with a third embodiment of a process for switching contexts according to the present invention. The embodiment of the process described herein may be used in connection with a return to a torn-away stack (interrupted context stack A) after the occurrence of a context switch that did not necessitate flushing of the RS to the backing store, such as the type of context switch explained above. Before the return to the torn-away backing store a portion of a backing store of interrupting context B was allocated for storing dirty registers in connection with both interrupting context (B) and the interrupted context (A). Since dirty registers in connection with the interrupted context (A) are not necessarily automatically flushed to the backing store upon context switch from A to B, these dirty registers are stored in the RS contiguously with the dirty registers of interrupting context (B). This allows the RSE, after the switch to context B, to perform eager RSE fills thereby increasing the likelihood that before returning to the interrupted context (A), the RS may reload therein a number of dirty registers of the interrupted context (A). Eager RSE fills to the RS causes a reduction in the time that otherwise, RSE may have needed to fill all the registers of context A missing from the RS at the time the switch back (return) to context A occurs.

The embodiment of the process of context switching according to the present invention allows limited multiple contexts, in this example contexts A and B, to share the RS, in connection with context switch events where the source context (context A) does not need to be accessed until the execution of the target context (context B) is complete. The process of switching contexts illustrated in connection with the flow chart of FIG. 9 is triggered by execution of a LOADRS instruction. A LOADRS instruction confers the capability of loading to the register stack a specified number of dirty bytes (that make up dirty registers), from context B's backing store that are stored below the current BSP (the BSP in connection with context B) thereby ensuring that the specified number of dirty bytes is present in the register stack. Typically, the specified number of dirty bytes below BSP includes the total number of dirty bytes related to context A. If the specified number of dirty bytes is not present in the register stack, the number of dirty bytes missing from the register stack is loaded at block 904 from the backing store. If all dirty bytes are already in the RS, no memory traffic is required. At block 906, all registers of the stack and NAT collections which correspond to locations below the tear point are marked "invalid" in the RS. The invalidation is performed as the registers below the tear point may contain values that were used in connection with context B and, thus, these values are indetermined with respect to context A.

After execution of the LOADRS instruction is completed by loading in the RS all registers in connection with context A that are missing in the RS, all registers and RNAT collections between the current (interrupting context) BSP and ("tear point") are present and marked as "dirty" in the RS. At the end of the process, RS has the same configuration it had prior to the switch to the interrupting context.

Figure 10:
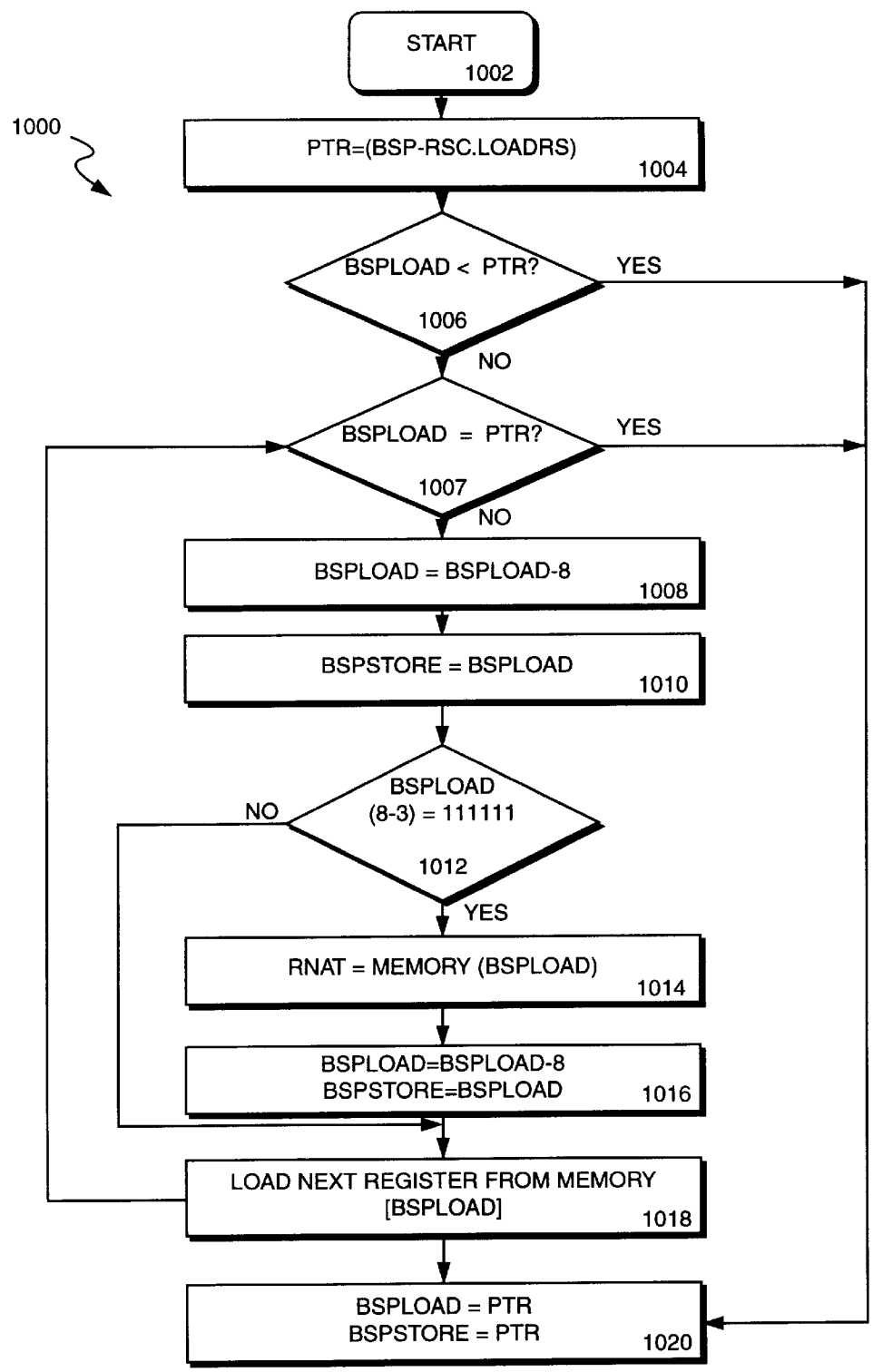
FIG. 10 illustrates a more detailed flow chart diagram in connection with the process for switching contexts triggered by LOADRS instruction in accordance with one embodiment of the present invention.

FIG. 10 illustrates a more detailed flow chart diagram in connection with a process for switching contexts triggered by a LOADRS instruction. FIG. 10 is a simplified flow chart that does not take into account cases when a stack address wrap around occurs. By way of example, a wrap around may occur if BSP has a value of 8 and RSE.loadrs has a value of 16. Based on FIG. 10 and the following description, persons skilled in the art could generalize the scheme described herein for the case when a wrap around occurs. The process 1000 starts at step 1002 from where it flows to step 1004. At step 1004, a pointer (PTR) is assigned a difference between BSP and RSC.loadrs. The value RSC.loadrs represents a distance between the backing store's BSP and the tear point of that backing store. In this case, the pointer (PTR) points to a location in the backing store of the interrupting context (context B) where the content of the last dirty register of context A is stored. "Distance" is herewith defined as the number of dirty registers of the source context plus the number of intervening NAT collections that have not been saved to the backing store of the source context upon the context switch.

At step 1006, it is determined whether BSPLOAD is smaller than PTR. BSPLOAD includes a pointer to a location in the backing store from where RSE performs load operations. The fact that BSPLOAD may be smaller than PTR means that there are no more registers belonging to the source context that have not been loaded back to the register stack. If BSPLOAD is smaller than PTR the process flows to block 1020 as there is no need to load registers of the source context to the RS. When the process reaches to block 1020, it means that all dirty registers that were originally in the RS before the context switch to the target context are now in the register stack. The BSPSTORE pointer is then assigned the value PTR and the BSPLOAD pointer is also assigned the value PTR. This resets the backing store pointers such that upon switch back to context A, BSPSTORE points to a location in the backing store compatible to the number of dirty registers belonging to context A residing in the RS (i.e., the backing store has enough room to store the dirty registers of the RS belonging to context A).

At block 1007, if BSPLOAD is equal to PTR, the process flows to block 1020, where BSPSTORE and BSPLOAD are assigned the value PTR. If BSPLOAD includes a pointer that is larger than PTR, the process flows to block 1008, where BSPLOAD is assigned the value BSPLOAD−8. If BSPLOAD is larger than PTR, there are still registers belonging to context that have not been loaded to the RS. Assignment of BSPLOAD−8 to BSPLOAD causes the address included in BSPLOAD to point to a next location in the backing store a content of which is to be loaded to the RS. At block 1010 BSPSTORE is assigned the content of BSPLOAD.

At block 1012, it is determined whether bits 8:3 of the BSPS are all "1"s. If so, the location of the backing store to which BSPLOAD points to is written to RNAT at block 1014. At block 1016, BSPLOAD is assigned the value BSPLOAD−8. At the same block, BSPSTORE is assigned the value BSPLOAD. Otherwise, the process continues to block 1018. At block 1018, a next register is loaded from the location in memory where the BSPLOAD address points. Note that if at block 1012, it is determined that the bits 8:3 of BSPLOAD are not all "1"s, the process jumps to block 1017. From block 1018, the process loops back to block 1007, where it is determined whether BSPLOAD is equal to PTR. During the process it may be determined whether an external interrupt is pending and enabled an if so the external interrupt is taken.

FIG. 5 illustrates a LOADRS control circuit that includes a state machine that may implement the process, the steps of which are illustrated in FIG. 10. The LOADRS state machine receives at the inputs thereof a BSP pointer, a BSPSTORE pointer, a BSPLOAD pointer, and a signal from the RSC register 520. The LOADRS state machine reads the value RSC.loadrs and subtracts this value from the BSP to obtain PTR. The LOADRS state machine then performs a series of operations such as comparisons, subtractions, assigning new values to the pointers, etc. to perform the steps illustrated and discussed in connection with FIG. 10. A LOADRS state machine according to the flow chart illustrated in FIG. 10 and the description thereof may be implemented by persons having ordinary skills in the art.

3. Processes Utilizing both the COVER Instruction and the LOADRS instruction (Asynchronous Backing Store Switch)

Figure 11:
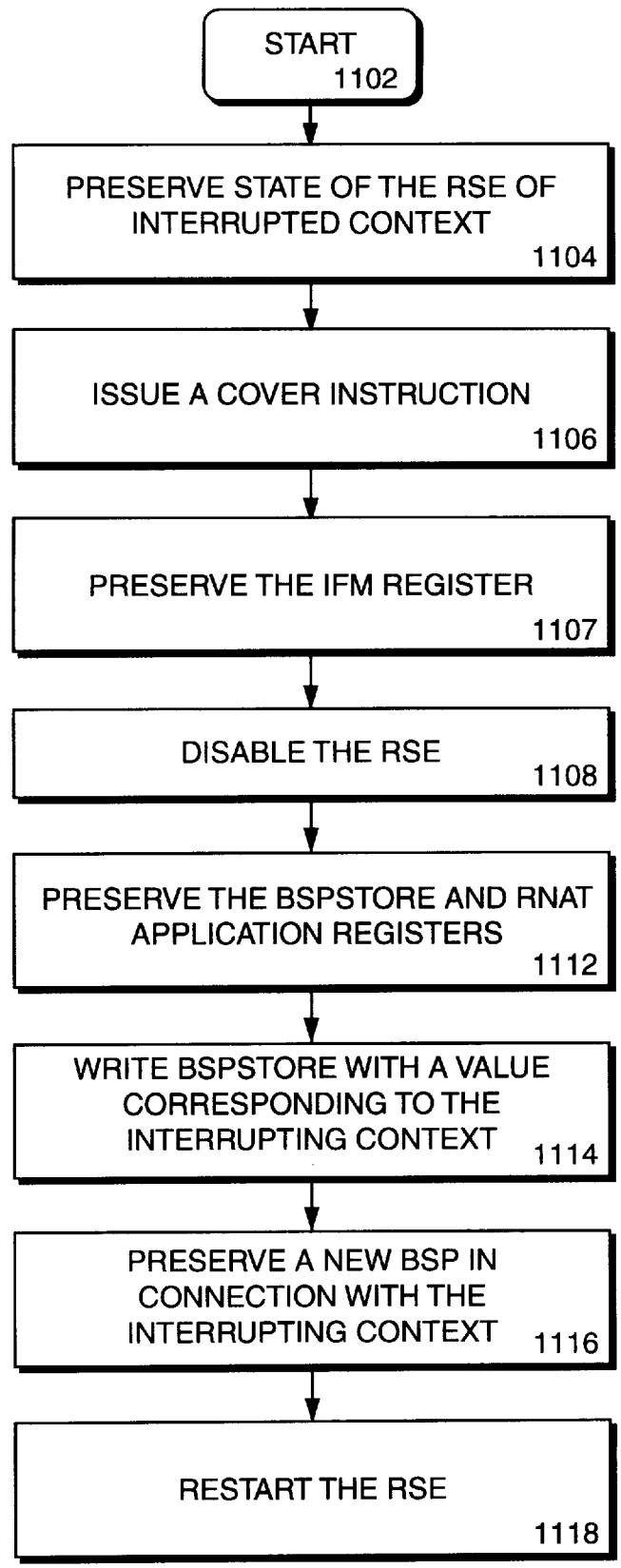
FIG. 11 illustrates a flow chart diagram in connection with a process for asynchronous switching a backing store from an interrupted context, the process utilizing the COVER instruction.

The present invention further provides a process for switching a backing store from an interrupted context and a process for returning from an interrupting context to an interrupted context. The first process uses the above-discussed COVER instruction while the second process uses the above-discussed LOADRS instruction. The first process may be implemented as a code sequence that may be used when an operating system has interrupted the program (user level or kernel level) and needs to take control over the register stack (RS) and over the register stack engine (RSE). In FIG. 11, the process starts at step 1102 and flows to step 1104 where a state of the RSE in connection with the interrupted context is preserved. This may be implemented by reading and saving the RSC and PFM application registers. The register stack configuration register (RSC) controls the operation of the RSC that includes mode bits that determine the mode of operation of the RSE such as eager RSE, lazy RSE, etc. The PFM register is a register that saves the content of the CFM register on a call from a procedure. At step 1106, a cover instruction is issued to cover the interrupted frame. The cover instruction causes the contents of the CFM to be saved to the IFM and setting of the IFM VALID bit. The cover instruction also causes the RSE to exchange information between both the first and second portions of the RS (current frame and dirty partition) and the backing store. The COVER instruction also causes setting the size of the CFM to zero. In this way, the current frame of the RS in connection with the interrupted context is made accessible to the RSE.

At step 1107, the IFM register is read and saved (preserved). The process then passes to step 1108 where the RSE is disabled. RSE is disabled by setting the mode of the RSE in the RSC register in a lazy mode. At step 1112, BSPSTORE and RNAT application registers are preserved by reading and saving these registers. At step 1114, the BSPSTORE is written with a value corresponding to the interrupting context, i.e., with a value where the RSE in connection with the interrupting context, is configured to write a next register from the RS in connection with the interrupting context At step 1116, a new BSP in connection with the interrupting context is preserved by reading and saving BSP so that a number of dirty registers may be calculated by subtracting the BSPSTORE value preserved at step 114 from the BSP preserved at step 116. Finally, at step 1118, the RSE is restarted by setting the mode, privilege level and byte order in the RSC.

Figure 12:
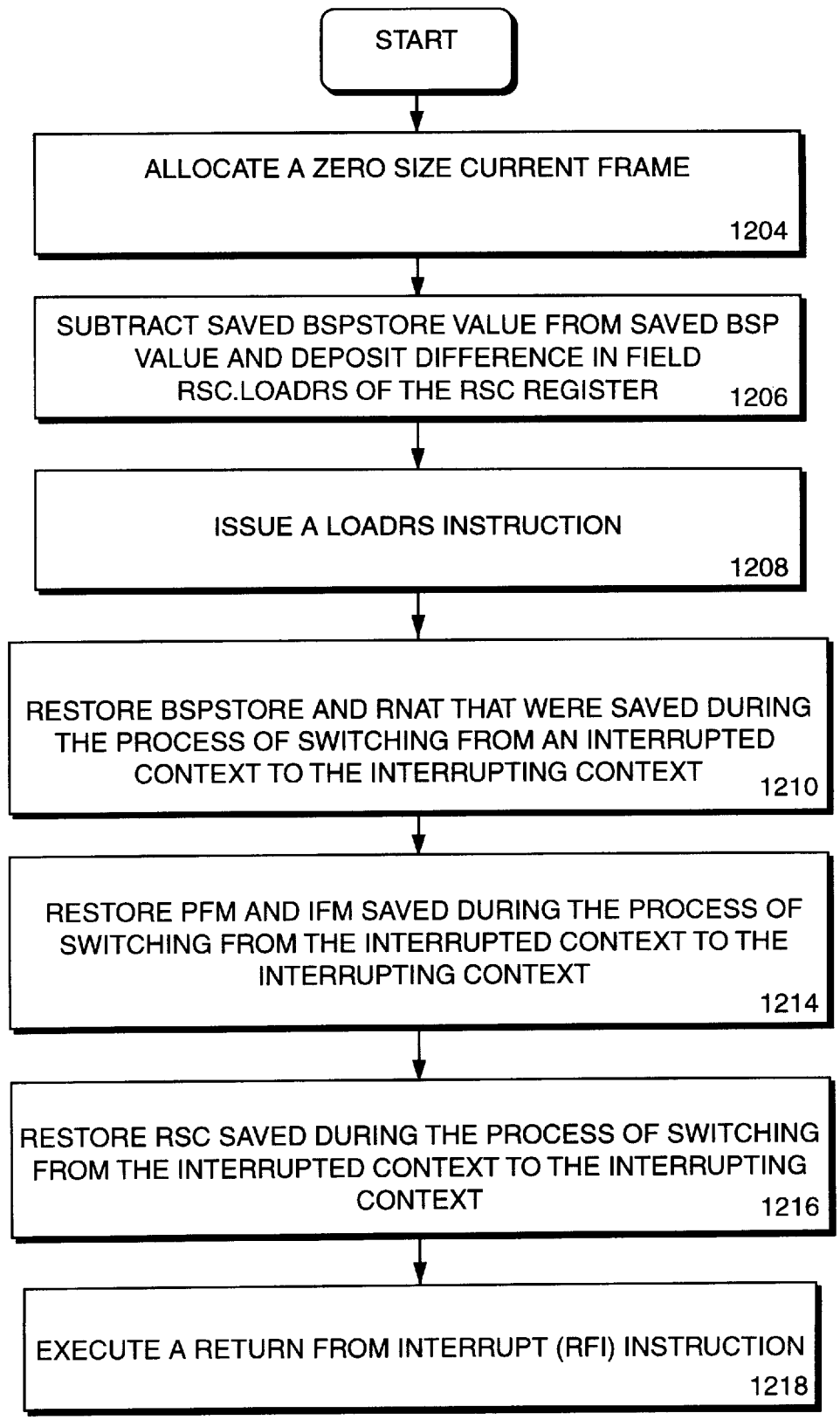
FIG. 12 illustrates a flow chart diagram in connection with a process for returning from an interrupting context to an asynchronously interrupted context, the process utilizing the LOADRS instruction.

FIG. 12 illustrates a code sequence that is used to return to an interrupted context from an interrupting context, after the code sequence described in connection with the flowchart of FIG. 11 was utilized to switch from the interrupted context to the interrupting context. This code sequence, illustrated in FIG. 12 utilizes the LOADRS instruction discussed above. Process 1200 starts at block 1202 from where it flows to block 1204. At block 1204, a zero size current frame is allocated. A zero size frame is allocated because in the first code sequence, for switching from the interrupted context to the interrupting context, a COVER instruction was issued. The COVER instruction caused RSE to access not just the dirty registers of the RS, but also the current frame portion. On return to the interrupted context, upon the execution of a LOADRS instruction, certain registers of the current frame that are not in the current frame upon return to the interrupted context may be loaded back to the current frame. The process then flows to block 1206 where the BSPSTORE value written during the first process at step 1114 is subtracted from the BSP value that was preserved during process 1100 preserved at step 1116. The difference is deposited in a field RSC.loadrs. At block 1208, a LOADRS instruction is issued to insure that registers from the interrupted context which were saved on the new backing store (related to the interrupting context) are loaded back into the register stack. At block 1210, the BSPSTORE and RNAT, saved at block 1112 of process 1100 are restored. At block 1214, the PFM and the IFM in connection with the interrupted context are also restored. At block 1216, the RSC preserved during process 1100 is restored. This restores the setting of the RSC enable bit as well as the RSC privilege level and byte order. At step 1218, a return from interrupt instruction is executed. The return from interrupt instruction determines whether the context of the IFM.VALID bit is valid, and, if so, the CFM is restored from the IFM.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. In a processor including a register stack (RS) having first and second portions, said processor including a register stack engine (RSE) to exchange information, in one of instruction execution dependent and independent modes between said second portion and a storage area, a computer-implemented process for switching from an interrupted to an interrupting context, the process comprising:

preserving a state of said RSE of said interrupted context;

issuing a COVER instruction, said cover instruction causing the processor to perform determining whether an interrupt handler needs to access said RS, and if so, validating a first register;

copying content of a second register to the first register;

causing the RSE to exchange information between a first portion and a second portion of the RS;

preserving a first pointer that points to a location in said storage area, of said interrupted context, where a next register of said second portion is to be written;

writing said first pointer with a value corresponding to said interrupting context; and preserving a second pointer, said first and second pointers defining said storage area in the interrupting context.

2. The process of claim 1 further including, disabling said RSE before preserving the first portion.

3. The process of claim 1 further including, restarting said RSE after writing said first pointer.

4. The process of claim 1 further including issuing a load said RS instruction.

5. The process of claim 4 further including restoring a first pointer in connection with the interrupted context, said first pointer pointing to a location in said storage area where a next register of said second portion is to be written.

6. The process of claim 5 further including issuing a Return From Interrupt (RFI) instruction.

7. The process of claim 6 further including, before issuing the load said RS instruction, a step of subtracting a first value from a second value, said first and second values being equal to first and second pointers that define a storage area that includes information related to an interrupted context, said first and second values saved when a switch occurs from an interrupted to an interrupting context.

8. The method of claim 7 wherein the load said RS instruction utilizes a difference between said first and second values.

9. The method of claim 7 wherein said first pointer is restored from said first value.

10. The method of claim 7 further including restoring a state of said RSC of said interrupted context.

11. The method of claim 10 wherein issuing the load said RS instruction includes the step of saving information (RSC) that controls said first portion.

12. The method of claim 10 wherein issuing the load said RS instruction further includes updating a first context top pointer (BSP) with an address where a last register of said first portion is configured to be stored.

13. The method of claim 12 wherein said updating is implemented using a programmable value specifying a number of registers included in said first portion.

14. The method of claim 13 wherein issuing the load said RS instruction further includes allocating a zero size to a value specifying a number of registers included in said first portion.

15. The method of claim 13 wherein restoring a first pointer includes disabling the RSE.

* * * * *